3,023,513
PROCESSING OF SYNTHETIC RUBBER OF
HIGH PLASTICITY
Paul Herte, Bernhard Springer, and Artur Karwowski,
Schkopau, Germany, assignors to VEB Chemische
Werke Buna, Schkopau, Germany
Filed Feb. 24, 1959, Ser. No. 795,173
Claims priority, application Germany Apr. 22, 1958
2 Claims. (Cl. 34—24)

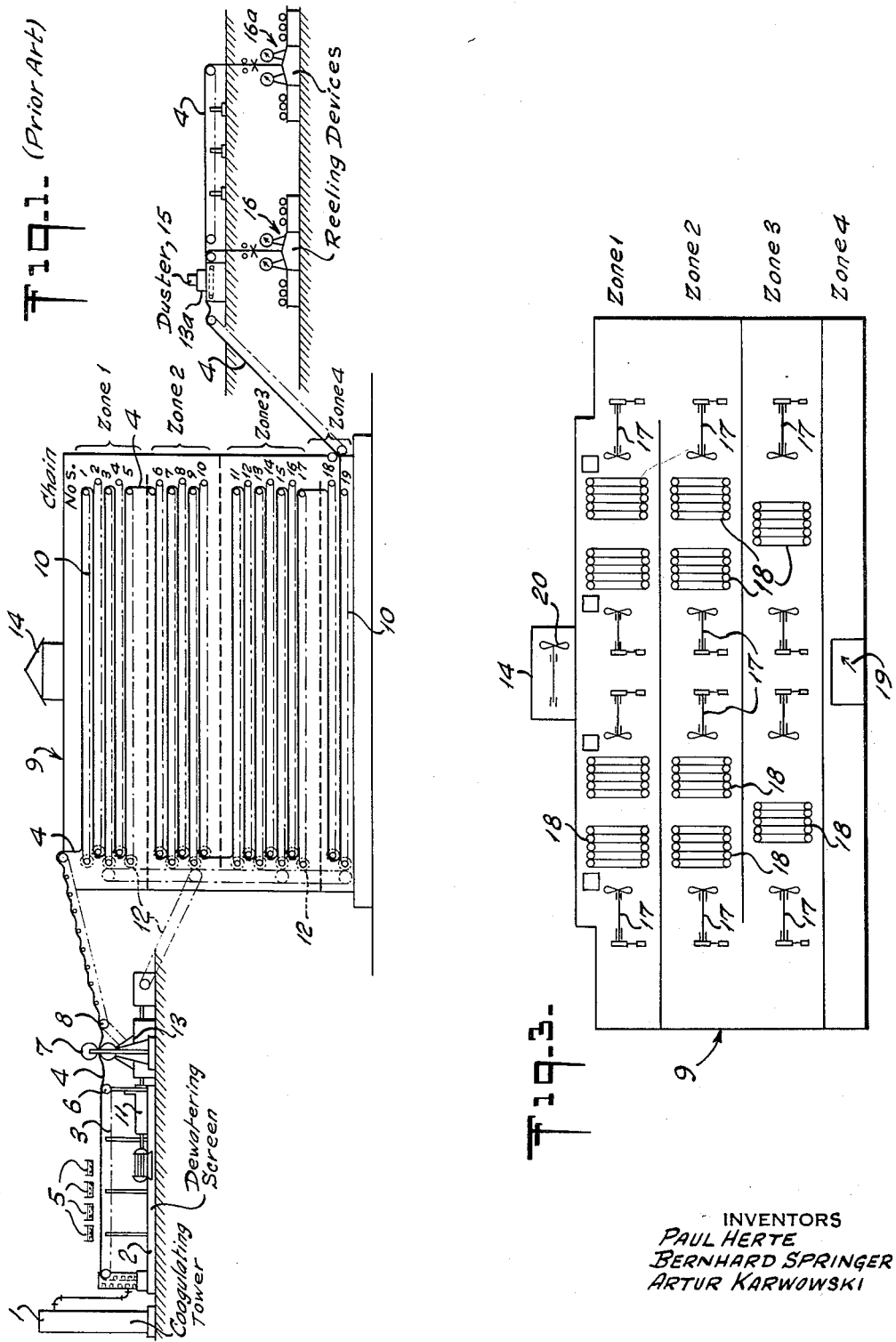

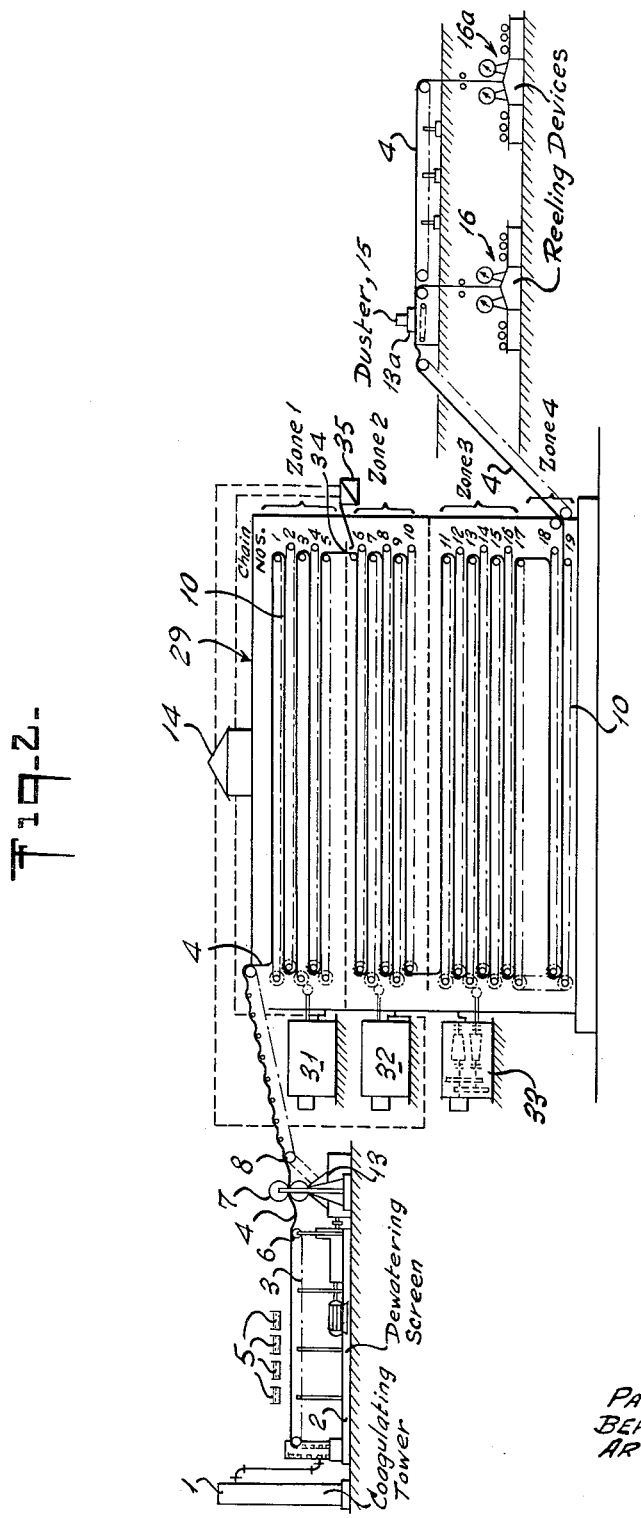

The present invention relates to the processing of synthetic rubber, more particularly of rubber of high plasticity, e.g. Mooney 40–70.

In the manufacture of synthetic rubber from copolymers of dienes and vinyl compounds, known under the trade names Buna S (GR–S) and Buna N (Perbunan and others), the drying operation is an important step, which presents considerable difficulties as yet not completely overcome, especially in rubbers of high plasticity.

The drying of the coagulated particles after precipitation from the aqueous dispersions in which they are obtained, may either be carried out by subjecting the rubber to the heat treatment necessary for removal of water, in the form of crumbs or in sheets. The method chosen depends on several factors: On the coagulating procedure, on the size and shape of the crumbs, and, most of all, on their plasticity. While it is comparatively simple to dry synthetic rubber having a Mooney value of 125–145 (German Defo-hardness 3000–4000; Defo-hardness is a value obtained by measuring the weight in grams necessary to compress a cylinder of rubber 10 mm. in diameter and 10 mm. high to 40% of its original height in 30 seconds. Defo values are a measure of plasticity generally accepted in Germany) by heating to temperatures of 120–130° C. for a short period, rubbers of Mooney plasticity 40–60 (Defo 400–800) will become very soft and tacky when heated to the above mentioned temperatures.

The drying of rubber in crumb form has a number of shortcomings. Crumbs are hard to feed evenly onto screen conveyors; the hot air circulating in the drier tends to pick up a considerable number of particles and to blow them into recesses and corners, where they collect and remain exposed to high temperature beyond the drying time. As a consequence, these particles become tacky, form an agglomeration of lumps, and lead to clogging and jamming of the movable parts of the apparatus, sometimes even to a break-down of drier units. Distribution of crumbs at an even level over the belt conveyor is likewise difficult. This leads to formation of moist pockets, since the drying air does not reach all crumbs.

A further drawback of drying the rubber in form of crumbs consists in the necessity of carrying out additional operations after drying, such as compressing, shaping and packaging. The uneven shape of the crumbs makes it hard to spot impurities such as foreign bodies, so that it becomes necessary to check the compressed crumbs once more for such impurities, for instance by going over them with a metal-detection device.

In view of the above-mentioned inconveniences an attempt has been made to introduce another method for drying synthetic rubber, namely drying in sheets. This method proved very satisfactory in the manufacture of synthetic rubber of Mooney plasticity, e.g. 125, and large units have been built for carrying out this process on an industrial scale. Similar aggregates were then used in the processing of synthetic rubber of high plasticity, Mooney 50 (see Chem. Ing. Progr. 1949, vol. 45, pp. 81–86). The high power driers used operate at temperatures of 143–137° C. at a speed of 9.15 m./min. and an output of 3.6 t./h. However, the results were quite unsatisfactory for similar reasons as the ones outlined above and it was necessary to return to the crumb-drying method (see Synth. Rubber, G. S. Whitby, 1954, p. 203 and 204, Wiley and Sons, New York); this is at present the only method used in large plants.

It is an object of the present invention to overcome the above mentioned drawbacks in the processing, more particularly the drying step of synthetic rubber of high plasticity.

It is another object to provide a process for drying soft synthetic rubber having a Mooney plasticity from 40–70 in sheet form.

Other objects and advantages of the present invention will become apparent from the detailed description hereinbelow.

In the following, the improvements accomplished according to the invention, will be demonstrated by the comparison of the processing method known and carried out in the existing manufacturing procedure and apparatus used therefor, with the novel procedure hereinafter described.

In the drawings:

FIG. 1 is a diagrammatic illustration, in the manner of a flow sheet, of the apparatus and method used in the existing manufacturing process of synthetic rubber, for processing and drying a continuous rubber sheet;

FIG. 2 illustrates the processing method according to the invention; and

FIG. 3 is a schematic showing of the arrangement of the blowers and of the heating units within the drier.

Referring now to FIG. 1, a tower 1 is shown wherein the rubber latex is coagulated by means of acid and inorganic salt solutions; the coagulate is passed on to a sheet-forming Fourdrinier-type dewatering screen 2, as used in paper making. On the endless screen conveyor 3, a matted rubber sheet 4 is formed, which is washed in continuous operation by the means of watering boxes 5. At the end of the Fourdrinier screen, the washed sheet passes a suction box 6 connected to a vacuum pump, or to a similarly operated suction roller, where most of the adherent water is removed mechanically. From there the pre-dried sheet 4 travels over pressure rollers 7 to a conveyor 8 which feeds it into a compartment or multiple-zone sheet drier 9. This drier comprises a number of endless caterpillar chains 10 with cross bars (19 chain tracks being illustrated as a matter of example), on which the sheet is dried by circulating hot air, as it passes from one zone to the next one. The caterpillar chains are driven by the main drive 11 of the screen belt, through an arrangement 12, and are travelling at constant speeds. With the speed of the conveyor 3 adjusted to 2.4 m./min., the first two caterpillar chains are moved at 2.58 m./min., chains 3 and 4 at 2.43 m./min., chains 5–7 at 2.27 m./min., chains 8–10 at 2.21 m./min., chains 11–17 at 2.15 m./min., and the last two caterpillar chains (18 and 19) similarly at a speed of 2.15 m./min. If, as an alternative, the conveyor speed is adjusted to 11.5 m./min., the respective chain speeds are (in the above order) 12.4, 11.65, 10.85, 10.6, 10.3 and 10.3 m./min.

A change in the speed of the conveyor 3 results in a similar change in speed of the caterpillar chains, since the drive of the former is rigidly connected to the drive of the latter by sprocket wheel arrangement 12. By providing, at the discharging end, additional drives 13 and 13a, we may vary only the intake and the discharge speeds of the rubber sheet. The caterpillar chains within the drier 9, however, have definite speeds, once they have been adjusted, said speeds being defined by the number of teeth on each gear, which may be different for each gear. Since in the drying of synthetic rubbers with low plasticity, e.g. Buna S3, Buna SS, and Buna N with Mooney plasticities 125 the sheet shrinks longitudinally, the speed of the chains is made to decrease as the drying proceeds.

Thus the speed of chains 11–17 only about 83% of the speed of chains 1 and 2 (2.15:2.58 m./min. or 10.3:12.4 m./min., respectively.) The drier is divided into 4 zones. Zones 1 to 3, serving for drying purposes and including 17 chain tracks in all, may be heated by steam operated heating units, whereas zone 4, having 2 tracks, remains unheated and serves as cooling zone. FIG. 3 is a schematic illustration of the drier 9 wherein the blowers 17 and heating units 18 are shown within each of the four zones. Entrance of the fresh air is shown at zone 4 and denoted by the arrow 19. FIG. 3 shows one half of the drier 9 in which twenty blowers and twenty heating units are installed in all, with one fan 20 added in the stack 14 for evacuation. Spent air laden with moisture escapes through a stack 14 at the top. The lower-most caterpillar 19 is coupled with a conveyor chain which transfers the dried sheet past a duster 15 for talcum application to reeling devices 16 and 16a where the sheet is weighed and wound onto cardboard cylinders forming rolls of 100 kgs.

Before the sheet is introduced into the drier 9, it is divided in half by a cut which however does not completely sever the two halves but leaves them attached to one another while the sheet passes through the drier and past the talcum applicator; final separation only takes place at the reeling devices 16 and 16a being provided with carriages. From the sheet which on the screen conveyor has a width of about 2.20 m., two dried rubber sheets will thus result, each about 0.85 m. wide, the loss in width being accounted for by shrinkage during the drying process.

By means of the aggregate above described, a continuous process of high efficiency can be carried out at a maximum speed of the main drive of 2000 kgs./hr., i.e. at an hourly yield of 16 to 20 reels of 100 kgs. each.

When attempts were made to use the apparatus for processing synthetic rubber having a Mooney value of 50 (Defo about 600) the drawbacks mentioned before were again encountered. While it is possible to obtain a coherent rubber sheet by using a Fourdrinier type dewatering screen, it was impossible to dry it successfully in the drier. These softer rubbers are more easily deformable and have a higher tackiness, particularly on the surface. When the moist sheet is passed into the multiple-zone drier, it expands as its temperature increases and as it dries, it becomes tangled at the cross bars of the drier and forms bulky lumps, which stick to the parts of the drier and cause breakage of the equipment.

The invention consists in the surprising discovery that the apparatus described above can be adapted for the use of drying soft rubbers, too, having a Mooney value of 50 (Defo 600 and less) if the elongation of the sheet, caused by heat, is compensated by a change in the rate at which the caterpillar chains are travelling. This compensation is accomplished by providing for each chain, or for each group of chains, individual drives, whose rate can be so varied that with increasing length of a sheet, as it becomes drier, the rate at which the sheet travels is similarly increased. In general, it is not necessary to have a separate drive for each chain, but it will be sufficient to combine several chains in a group or zone and to provide them with a common drive of variable speed, e.g. a continuous gear.

The process according to the invention will now be more fully described with reference to FIG. 2 of the drawing.

The general arrangement of the apparatus for carrying out the new process is similar to the one illustrated in FIG. 1. There is a tower or unit 1 for coagulation of rubber particles from latex, a de-watering, sheet-forming screen 2, with conveyor 8 for transfer of the rubber sheet to a drier 29. The rate of travel of the sheet at the conveyor 8 is the same as in the apparatus illustrated in FIG. 1.

The drier 29, however, is provided with a basically different equipment. The drier is again divided in zones of different temperature; zones 1, 2, and 3 are heating zones, zone 4 is a cooling zone. Each of zones 1, 2, and 3 is provided with a continuous regulating gear 31, 32 and 33, respectively, as drive means, the regulating range being 1:4.5. Contrary to the arrangement of the drier 9 in FIG. 1, there are no transmission sprockets from one zone to the other. The sprocket wheels of the individual caterpillar chains are maintained, in this arrangement too, so that the differences in rates are constant.

For instance, chains 1–5 having speeds of 2.58 m., 2.58 m., 2.43 m., 2.43 m. and 2.27 m. per minute may be increased continuously to a 4.5 fold rate by regulating gear 31, i.e. they may assume maximum speeds of 11.6 m., 11.6 m., 10.9 m., 10.9 m. and 10.2 m. per minute, respectively. Such an increase will hardly be necessary in the first zone, since in that area of the drying process there is no considerable elongation of the sheet. Due to the high evaporation in that zone, the sheet will not reach the high temperature of the surrounding air which ranges from 120–125° C. Preferably, steam of 120° C. administered at 2.5 atmospheres excess pressure is used for heating and airing purposes. When sheets of a Mooney 50 (Defo ab. 600) are processed, an increase in speed to about 1.1–1.2 m./min. will generally be sufficient for the first 5 chains (zone 1), if any elongation of the sheet occurs at all in these zones.

Zones 2 and 3, however, do need a more marked regulation of the chain speeds since in these zones the rubber sheet may reach higher temperatures, such as 100–110° C., due to lower evaporation of water; therefore, elongation and surface tackiness are considerable. Regulating gear 32 of zone 2 will be adjusted to a ratio 1:1.2 to 1:1.3, when rubber with Mooney 50 is being dried. Regulating gear 33 of zone 3 is adapted to compensate for a further elongation of the rubber sheet at a ratio of 1:1.3 to 1:1.4.

Adjustment of speeds by the regulating gears 31, 32, and 33 is also dependent on the rate of the screen conveyor, the sheet thickness, and the rubber brand, as well as on the conditions of coagulation. With an increase of rate of the screen conveyor—the sheet thickness remaining the same—a low acceleration of the chains in zones 1 and 2 will be needed, but a high acceleration in zone 3. This is due to the lower heat increase in the sheet while it passes through the drier zones 1 and 2 because of larger evaporation of water. It will be understood that there is interdependence between the size of the aggregate, and the drier, the amount of water to be removed in the latter, and the quantity of hot air to be supplied. When the sheet thickness increases, the chains will have to move more rapidly in zones 1, 2, and 3, since the sheet tends to soften and to hang through, due to higher weight, between the cross bars in the drier, and particularly at the transition from one zone to the next. Such a sag in the sheet will be taken up by larger speed of the chains. As mentioned before, the type of the rubber undergoing processing, the composition of the co-polymer, and the size of coagulated particles influence the softening process and thus the speed regulation by the gears.

Proper adjustment of the different speeds in the several drying zones has to be determined in each case. For some Mooney plasticities it may be advisable to provide further subdivisions as to adjustability of the caterpillar chains in the drier, for instance, by associating a special gear to each two chains. Regulation of speeds can be done by hand, but may also be made automatic by arrangement of suitable feeler devices, e.g. by providing a feeler at the point designated by 34 in FIG. 2 which upon undue elongation of the sheet at this point will transmit chain acceleration by actuation of a regulating element 35 on gear 32 (not shown).

The drier design illustrated in FIG. 2, and the process described in connection therewith, is only one embodiment of the invention illustrating the principle of individual regulation of the speeds of the caterpillar chains. Instead of continuous gear drives, other known transmissions may be used, in short any device which will permit variation of speeds of the travelling chains, or groups of chains, in one zone with respect to another zone. Such a variation of speed could also be achieved by gears rigidly connected to each chain, but the repeated assembly and dismantling of such gears with the chain carriers and the necessary discontinuation of work would considerably reduce the capacity of the drier.

One of the advantages of the processing method according to the invention resides in the possibility of using the apparatus comprising the coagulating unit, screen conveyor, pre-drier and drier for synthetic rubbers of widely differing Mooney plasticities 50–125 (Defo values 600–3000) by simple adjustment of the gear drives. Many different types of rubbers can thus be produced selectively, without requiring expensive investment in machinery for each individual type. Even especially soft rubbers with high surface tackiness, e.g. oil-filled rubbers with Mooney values below 50 (Defo values about 400) can be processed in sheet form and dried as described. The soft rubbers with Mooney values 50 are wound without talcum application in core-less cylinders weighing 25 or 50 kgs. each, and are ready for immediate processing in chemical industries. Hard rubbers, Mooney 125–135 (Defo 3000 to 4000) are dusted with talcum and wound as cylindrical rolls weighing 50–100 kgs. each. They need the application of talcum, since they have to undergo thermal oxidation for softening, which is mainly carried out on shredded rubber. For this treatment, the sheets have to be unreeled from their cylindrical cores.

In the following example we are going to describe the processing of a modified soft synthetic rubber of the Buna S series (Buna S4). The latex is obtained by co-polymerization in aqueous phase at 50° C. of 68 parts butadiene and 32 parts styrene in the presence of diisobutyl naphthalene sodium sulfonate as emulsifier, potassium persulfate as activator, and diisopropyl xanthic disulfied as modifier. We may, however, use the processing method, according to the invention, of rubber in sheets on other copolymers made, for instance, from other monomers such as butadiene and acrylo nitrile, or oil-plasticized rubbers, and cold-rubber types.

*Example*

The above mentioned Buna S4 latex contains about 35 g. solid matter in 100 g. latex. 4.3 cubic meters of this latex are precipitated hourly with 100 l. of aqueous 28% magnesium chloride solution and 120 l. of 10% acetic acid solution being diluted with about 45 cubic meters water, while passing through a tube in a continuous stream (from unit 1 of FIG. 2). The rubber crumbs are transferred to the endless screen conveyor of units 2 and 3, and are there made into a continuous matted rubber sheet 4. The rate of the screen conveyor is adjusted to 9 m./min. by means of the main drive 11. The thickness of the rubber sheet is about 10–15 mm. The sheet is washed throughout its length (at 5) with precleaned (river) water. Part of the water is circulated. At the discharge end of the screen 3, the moist sheet travels past a dandy roll and a suction roller 6, where adhering moisture is removed from the sheet to leave only a residual amount of 30–35% water. Two more rollers 7 serve to impart to the moist sheet a greater coherence; a conveyor belt 8 then transfers it to the top of drier 29. Regulating gear 31 is adjusted to a ratio 1:1.1, gear 32 to a ratio 1:1.13, and gear 33 to a ratio 1:1.26 m./min. With this adjustment, the drying sheet travels smoothly without snarling or balling up, over all the conveyor chains through the entire drier. The temperature is adjusted automatically to 125° C. (hot air) in zone 1, 120° C. in zone 2, and 100° C. in zone 3. Zone 4 is operated without hot air and serves as a cooling zone. The moisture content of the sheet is about 35% on entering the drier, about 15% on leaving zone 1, about 3% on leaving zone 2, and less than 0.5% upon discharge from zone 4. At the outlet opening from drier 29, the sheet is transferred past the talcum duster, which is, however, not used in this particular instance. Then, the sheet arrives in two halves at the winding machines, where it is reeled in two core-less cylindrical rolls of 50 kgs. each. The rolls are then marked and wrapped in PVC foils.

The output of the entire aggregate in the above example is 1.6 metric tons solid rubber per hour.

What is claimed is:

1. A process for drying highly plastic synthetic rubbers in sheet form having Mooney values of from 40–70, which comprises passing said rubber sheet through a plurality of drying zones and regulating the velocity of travel of said rubber sheet through said zones in proportion to an increase in length of said rubber sheet brought about by the increase in temperature of said rubber sheet during the drying operation.

2. A process for drying highly plastic synthetic rubbers in sheet form having Mooney values of from 40–70, which comprises passing said rubber sheet through a first heating zone at 125° C., then through a second heating zone at 120° C., and finally through a third heating zone at 100° C., and increasing the speed of the travelling sheet at the rate of 1:1.1 in the first zone, at the rate of 1:1.13 in the second zone, and at the rate of 1:1.26 in the third zone, wherein 1 stands for the speed at which the sheet is transferred to said drier, so as to offset an increase in length of said rubber sheet brought about by the increase in temperature of said sheet during the drying operation.

References Cited in the file of this patent

UNITED STATES PATENTS

| | | |
|---|---|---|
| 234,412 | Lee et al. | Nov. 16, 1880 |
| 1,284,305 | Gammel | Nov. 12, 1918 |
| 1,297,926 | Starr | Mar. 18, 1919 |
| 1,689,201 | Halter | Oct. 30, 1928 |
| 1,792,316 | Leguillon | Feb. 10, 1931 |
| 1,973,059 | Gerke | Sept. 11, 1934 |
| 2,304,858 | Stewart et al. | Dec. 15, 1942 |
| 2,424,648 | Bixby | July 29, 1947 |